United States Patent [19]

Duffy

[11] 4,417,999

[45] Nov. 29, 1983

[54] FREE FLOWING ANTISTATIC COMPOSITION

[75] Inventor: James P. Duffy, Memphis, Tenn.

[73] Assignee: Witco Chemical Corporation, New York, N.Y.

[21] Appl. No.: 384,444

[22] Filed: Jun. 3, 1982

[51] Int. Cl.$^3$ ............................ C08L 3/36; C08L 5/17
[52] U.S. Cl. ...................................... 252/383; 252/88; 252/384; 252/385; 524/612; 528/244; 528/493
[58] Field of Search ................ 252/383, 384, 385, 88; 524/612; 528/244, 493

[56] References Cited

U.S. PATENT DOCUMENTS

| | | | |
|---|---|---|---|
| 3,959,174 | 5/1976 | Winyall et al. | 252/317 |
| 4,058,124 | 11/1977 | Yen et al. | 524/612 |
| 4,198,333 | 4/1980 | von Bonin et al. | 524/612 |
| 4,210,556 | 7/1980 | Castro et al. | 525/6 |
| 4,279,879 | 7/1981 | Winyall et al. | 423/335 |
| 4,314,040 | 2/1982 | Castro et al. | 525/6 |

*Primary Examiner*—Irwin Gluck
*Attorney, Agent, or Firm*—Wallenstein, Wagner, Hattis, Strampel & Aubel

[57] ABSTRACT

A free flowing antistatic composition is provided in a solid particulate form for use with polymeric materials. The composition is a flowable mixture of predominantly $C_{18}$ alkyl ethoxylated primary amine particulates with micron sized silica gel particulates. The composition of the present invention is particularly useful with food packaging polyolefin materials.

16 Claims, No Drawings

FREE FLOWING ANTISTATIC COMPOSITION

FIELD OF THE INVENTION

The present invention relates to solid antistatic agents useful with polymers.

BACKGROUND AND DISCUSSION OF THE PRIOR ART

It has long been known that various polymers tend to collect electrostatic charges on their surface. This tendency creates difficulty in the handling of the polymer and of articles made therefrom, for it occurs during storage, as well as in the course of processing the polymers into shaped forms, such as filaments, sheets, films, and molded plastics.

Such electrostatic charges cause dust and dirt particles to adhere to the plastic surfaces and, also, the plastic surfaces to adhere to each other or to the equipment used in processing. Under certain circumstances, the accumulated charges may give rise to sparks, with an attendant fire hazard. The tendency toward the building of electrostatic charges is especially marked in the case of polymers and copolymers made from ethylenically unsaturated monomers, such as polymers and copolymers of vinyl chloride, vinylidene chloride, styrene, and the various polyolefins, such as polyethylene, polypropylene, and polybutylene.

Among the approaches taken in the prior art to reduce the tendency of plastic materials toward electrostatic charging has been either to coat the plastic material with an antistatic composition, or to incorporate it into the body of the plastic material. The latter expedient is generally considered to be more effective. Compounds which have been proposed for this purpose include polyalkylene glycols and their esters and ethers, and a wide variety of amines and amides.

Many of the amine or amide antistatic agents are liquids which, when incorporated into the resin compositions, migrate to the surface at an undesirably rapid rate, causing losses by evaporation, diminished antistatic effectiveness, development of undesirable odors, and adversely affecting the surface properties of the plastic, for example, by promoting cracking or crazing.

Attempts to use solid amine antistatic agents with polymers were unsuccessful in that with time the ethoxylated amine particulates would agglomerate and present feeding problems.

Another approach to avoid the use of liquid antistatic agents is disclosed in U.S. Pat. Nos. 4,210,556, granted July 1, 1980, and 4,314,040, granted Feb. 2, 1982, to Castro et al, wherein it is disclosed to incorporate the liquid amine in a base resin such as polyproylene particulates of ⅛ to 1/16 inch in diameter. This approach involves a costly process and the effective amount of amine antistatic agent is generally no more than about 50% activity in commercial application.

In the plastic extrusion field, it is known that micron sized silica gels are useful as anticaking agents in plastic extrusion operations.

It is therefore, a principal object of the present invention to provide a novel solid antistatic composition and a method for making the composition.

It is another object of the present invention to provide a composition as aforesaid in which there is a highly effective amount of antistatic agent per unit weight of composition.

It is another object of the present invention to provide a composition as aforesaid which is readily and inexpensively processed from relatively inexpensive materials.

It is another object of the present invention to provide an antistatic agent which remains free flowing over extended periods of time.

It is still a further object of the present invention to provide a solid antistatic agent which is useful in and acceptable with food grade polyolefin packaging materials.

The aforesaid, as well as other objects and advantages, will become apparent from a reading of the following description and the adjoined claims.

BRIEF SUMMARY OF THE INVENTION

A solid free flowing antistatic composition formed from the admixture of high molecular weight ethoxylated alkyl amines in solid form with micron sized particulates of silica gels, which mixture provides a free flowing powder which remains free flowing with time.

The ethoxylated amine is sprayed and cooled, and immediately upon spraying and cooling mixes with the silica gel particulates before being packaged.

DESCRIPTION OF THE PREFERRED EMBODIMENTS

Broadly speaking, the present invention is the mixture of an ethoxylated high molecular weight amine and micron sized silicon dioxide particulates as a free flowing powder.

In accordance with a preferred embodiment of the present invention, high molecular weight alkyl ethoxylated amines are employed which are derived from alkyl, primary alkenyl or mixed alkenyl and alkyl amines in which the alkenyl and alkyl moiety each have a chain length of between about 16 and 22 carbon atoms being predominantly $C_{18}$. Such amines are obtained from hydrogenated and fractionated derivatives of soya, oleyl or tallow, or mixtures thereof. Hydrogenated tallow is most preferred. If desired, mixtures of such amines may be employed.

The amines are ethoxylated with about 1-3 moles of ethylene oxide per mole of amine, and preferably about 2 moles ethylene oxide/mole of amine.

The amines are heated above their melting point, sprayed and cooled, and are then contacted or admixed with the micron sized silicon dioxide or silica gel, and the mixture forming a free flowing powder, which powder remains free flowing over extended periods.

Suitable silicon dioxide particulates useful in the present invention, include by way of example, a broad range of silicas, including pyrogenic silicas, silica gels, and precipitated silicas. Preferred are the silica gels.

Silica gels are of two types —hydrogels and aerogels. Hydrogels are prepared by reacting a soluble silicate such as sodium silicate with strong sulfuric acid. The gel is washed salt-free, dried, steam micronized, and then classified. Aerogels are prepared from crude hydrogels by displacing its water content with an alcohol. The alcohol is then recovered by heating the gel in an autoclave.

Aerogels are lighter and fluffier than hydrogels because the shrinkage of the gel structure is avoided during the drying process. Gels have very large surface areas, generally in the range of $300-1,000 m^2/g$ and high porosities. Silica gels are sold, for instance, by W. R. Grace and Company under the trademark "Syloid ®";

and Glidden under the trademark "Silcron ®". Most preferred are Syloid ® 72 and 244.

The silica gel should have a particle size of less than 10 microns and preferably between about 3–5 microns.

In the practice of the present invention, the silica gel need by present in small amounts of from about 5 to 10 percent by weight of the ethoxylated amine, and preferably 7 to 8 percent by weight. It is to be noted that this limited amount of the silica gel permits a high antistatic activity per unit weight of antistatic amine composition. The ethoxylated amine is present in an effective amount of at least about 90% by weight of the composition.

EXAMPLE

A sample of a $C_{18}$ ethoxylated (approximately 2 moles ethylene oxide/mole amine) primary alkyl amine having a melting point 50–52° C. was heated to above the melting point and sprayed to a fine powder, and was then admixed with 7½% by weight of Syloid ® 244, 3 micron particle size fumed silica. The mixture was free flowing and packaged, it did not cause feeding problems, and remained free flowing after packaging and storage.

The antistatic composition of the present invention is useful with a broad range of plastic materials, including by way of example polymers and copolymers made from ethylenically unsaturated monomers (e.g. vinyl chloride, vinylidene chloride, styrene, and the like) and polyolefins (e.g. polyethylene, polypropylene, polybutylene, and the like), particularly polyethylene.

It has been found that the free flowing antistatic powder of the present invention remains so with extended storage, and remains effective over a long period of time, and was found to be particularly effective and acceptable with food grade polyolefin packaging materials.

Reasonable variations and modifications which will become apparent to those skilled in the art can be made in the present invention without departing from the spirit and scope thereof.

The embodiments of the invention in which an exlusive property or privilege is claimed are defined as follows:

1. A particulate free flowing antistatic composition for a polymer comprising an ethoxylated alkyl amine and silicon dioxide particulates.

2. The antistatic composition of claim 1, wherein the silicon dioxide comprises micron sized silica gel.

3. The antistatic composition of claim 1 or 2, said amine comprising predominantly a $C_{18}$ alkyl primary amine.

4. The antistatic composition of claim 1, said silicon dioxide particulates being about 3–5 microns, and being present in about 5 to 10 percent by weight of the composition.

5. The antistatic composition of claim 1 or 2, said amine being a $C_{16}$–$C_{22}$ alkyl primary amine ethoxylated with about 2 moles of ethylene oxide.

6. The antistatic composition of claim 1, said composition being free flowing, and remaining so with extended periods of time.

7. the antistatic composition of claim 1, said silicon dioxide being a silica gel.

8. The antistatic composition of claim 7, wherein the amine is $C_{16}$–$C_{22}$ alkyl primary amine.

9. The antistatic composition of claim 8, wherein the silica gel is present in an amount of from 7 to 8 percent by weight.

10. The antistatic composition of claim 1, wherein the ethoxylated amine is present in at least about 90% by weight of the composition.

11. A method of making a solid free flowing antistatic composition comprising spraying an ethoxylated amine to form a powder and mixing with silicon dioxide particulates so as to form a free flowing powder.

12. The method of claim 11, wherein the mixing is immediately upon spraying.

13. The method of claim 12, wherein the silicon dioxide comprises 3–5 micron sized silica gel.

14. The method of claim 12, said amine comprising a $C_{16}$–$C_{22}$ alkyl primary amine ethoxylated with about 2 moles of ethylene oxide.

15. The method of claim 12, said silicon dioxide being present in about 5–10 percent by weight of the composition.

16. the method of claim 14, wherein the amine is present in at least about 90% by weight of the composition.

* * * * *